United States Patent
Weiss et al.

(10) Patent No.: US 12,258,899 B1
(45) Date of Patent: Mar. 25, 2025

(54) VARIABLE GEOMETRY TURBOCHARGER CONTROL

(71) Applicant: Caterpillar Inc., Peoria, IL (US)

(72) Inventors: Kevin Weiss, Peoria, IL (US); James Mutti, Germantown Hills, IL (US); Ryan Treanor, Peoria, IL (US); Nicholas Williams, Dunlap, IL (US); Emanuelle Carduner, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/494,582

(22) Filed: Oct. 25, 2023

(51) Int. Cl.
| | |
|---|---|
| *F02B 37/24* | (2006.01) |
| *F01D 7/02* | (2006.01) |
| *F01D 17/14* | (2006.01) |
| *F02B 37/12* | (2006.01) |
| *F02D 41/00* | (2006.01) |
| *F02D 41/04* | (2006.01) |

(52) U.S. Cl.
CPC .............. *F02B 37/24* (2013.01); *F01D 17/14* (2013.01); *F01D 7/02* (2013.01); *F02B 37/12* (2013.01); *F02B 2037/122* (2013.01); *F02D 41/0007* (2013.01); *F02D 41/04* (2013.01); *F05D 2220/40* (2013.01)

(58) Field of Classification Search
CPC .... F02B 37/24; F02B 37/12; F02B 2037/122; F01D 17/14; F01D 7/02; F02D 41/0007; F02D 41/04; F05D 2220/40
See application file for complete search history.

(56) References Cited

U.S. PATENT DOCUMENTS

| | | | |
|---|---|---|---|
| 4,671,068 A | 6/1987 | Moody et al. | |
| 6,272,859 B1* | 8/2001 | Barnes | F02D 41/0007 60/602 |
| 6,928,817 B2 | 8/2005 | Ahmad | |
| 8,302,397 B2 | 11/2012 | Liu et al. | |
| 8,640,459 B2 | 2/2014 | Ge et al. | |
| 9,322,363 B2 | 4/2016 | Kostrzewski | |
| 2011/0036086 A1* | 2/2011 | Liu | F02D 41/1401 60/602 |
| 2019/0024576 A1* | 1/2019 | Van Nieuwstadt | F02B 37/004 |

FOREIGN PATENT DOCUMENTS

CN 102135046 A 7/2011

\* cited by examiner

*Primary Examiner* — Brandon D Lee
(74) *Attorney, Agent, or Firm* — Xsensus, LLP

(57) ABSTRACT

A machine includes a VGT and a controller. The controller monitors, based on causing the VGT to operate according to the non-dynamic control scheme, a plurality of hardware limit parameters associated with an engine of the machine. The controller determines that a hardware limit parameter, of the plurality of hardware limit parameters, satisfies a dynamic threshold for the hardware limit parameter and thereby causes the VGT to operate according to a dynamic control scheme. The controller then monitors the plurality of hardware limit parameters and thereby determines that each hardware limit parameter, of the plurality of hardware limit parameters, satisfies a non-dynamic threshold for the hardware limit parameter. The controller therefore causes the VGT to operate again according to the non-dynamic control scheme.

17 Claims, 4 Drawing Sheets

VARIABLE GEOMETRY TURBOCHARGER CONTROL

TECHNICAL FIELD

The present disclosure relates generally to a variable geometry turbocharger (VGT) and, for example, to control of the VGT.

BACKGROUND

A VGT is a type of turbocharger with an adjustable geometry that can be used in a machine to facilitate an optimized performance of the machine. For example, one or more components of the VGT can adjust to control a flow and/or pressure of exhaust gas flowing through the VGT, which enables improved efficiency, enhanced power output, and better response in the machine. Over an operable life of the VGT, the one or more components of the VGT are subject to wear, such as due to movement of the one or more components (e.g., between different positions). This affects a durability of the one or more components, which decreases a performance of the VGT, and ultimately leads to failure of the one or more adjustable components and therefore failure of the VGT. Consequently, there is a need for a control strategy for the VGT that allows for the VGT to provide an optimized performance of the machine and that also reduces a number of unnecessary movements of the VGT (e.g., to improve durability of the one or more components of the VGT and to avoid failure of the VGT).

U.S. Pat. No. 8,302,397 (the '397 patent) discloses controlling a sequential turbocharger by generating a control mode signal based on an engine speed signal, an engine torque signal, and an engine mode signal. The control mode signal indicates one of an open-loop control mode and a closed-loop control mode. A feed-forward value is determined based on the control mode signal, the engine speed signal, and the engine torque signal. A loop control value is determined based on the feed-forward value, a variable geometry turbine control signal, and an error signal when the control mode signal transitions from the open-loop control mode to the closed-loop control.

While the '397 patent discloses some benefits for controlling a sequential turbocharger, the present disclosure is associated with a controller controlling a VGT of an engine by monitoring a plurality of hardware limit parameters associated with the engine (rather than an engine speed signal, an engine torque signal, and an engine mode signal), and determining whether to cause the VGT to operate according to a dynamic control scheme or a non-dynamic control scheme. This allows for the VGT to provide an optimized performance and improves a durability of one or more components of the VGT.

The controller of the present disclosure solves one or more of the problems set forth above and/or other problems in the art.

SUMMARY

In some implementations, a machine comprises: a variable geometry turbocharger (VGT); and a controller configured to: cause the VGT to operate according to a non-dynamic control scheme; monitor, based on causing the VGT to operate according to the non-dynamic control scheme, a plurality of hardware limit parameters associated with an engine of the machine during a first time period; determine, based on monitoring the plurality of hardware limit parameters during the first time period, that a hardware limit parameter, of the plurality of hardware limit parameters, satisfies a dynamic threshold for the hardware limit parameter; cause, based on determining that the hardware limit parameter satisfies the dynamic threshold, the VGT to operate according to a dynamic control scheme; monitor, based on causing the VGT to operate according to the dynamic control scheme, the plurality of hardware limit parameters during a second time period; determine, based on monitoring the plurality of hardware limit parameters during the second time period, that each hardware limit parameter, of the plurality of hardware limit parameters, satisfies a non-dynamic threshold for the hardware limit parameter; and cause, based on determining that each hardware limit parameter satisfies the non-dynamic threshold for the hardware limit parameter, the VGT to operate again according to the non-dynamic control scheme.

In some implementations, a controller of a machine includes one or more memories; and one or more processors configured to: identify that a VGT of the machine is operating according to a non-dynamic control scheme; monitor, after identifying that the VGT is operating according to the non-dynamic control scheme, a plurality of hardware limit parameters associated with an engine of the machine; determine, based on monitoring the plurality of hardware limit parameters, that a hardware limit parameter, of the plurality of hardware limit parameters, satisfies a dynamic threshold; and cause, based on determining that the hardware limit parameter satisfies the dynamic threshold, the VGT to operate according to a dynamic control scheme.

In some implementations, a method includes identifying, by a controller of a machine, that a VGT of the machine is operating according to a dynamic control scheme; monitoring, by the controller and after identifying that the VGT is operating according to the dynamic control scheme, a plurality of hardware limit parameters associated with an engine of the machine; determining, by the controller and based on monitoring the plurality of hardware limit parameters, that the plurality of hardware limit parameters satisfy a plurality of non-dynamic thresholds; and causing, by the controller and based on determining that the hardware limit parameter satisfies the dynamic threshold, the VGT to operate according to a non-dynamic control scheme.

DETAILED DESCRIPTION

This disclosure relates to a controller, such as an engine control module (ECM), controlling a variable geometry turbocharger (VGT), such as by causing the VGT to operate according to a particular control scheme of multiple control schemes. The controller and the VGT, as described herein, have universal applicability to any machine utilizing such a controller and a VGT. The term "machine" may refer to a vehicle, any machine that performs an operation associated with an industry such as, for example, mining, construction, farming, transportation, or any other industry, and any other machine that includes a VGT. As some examples, the machine may be an automobile (e.g., a passenger car, a truck, or another vehicle), an off-highway truck, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, a pump, a power generation set (e.g., a "genset"), stationary equipment, non-stationary equipment, or other above ground equipment, underground equipment, aerial equipment, or marine equipment.

Figure 1:
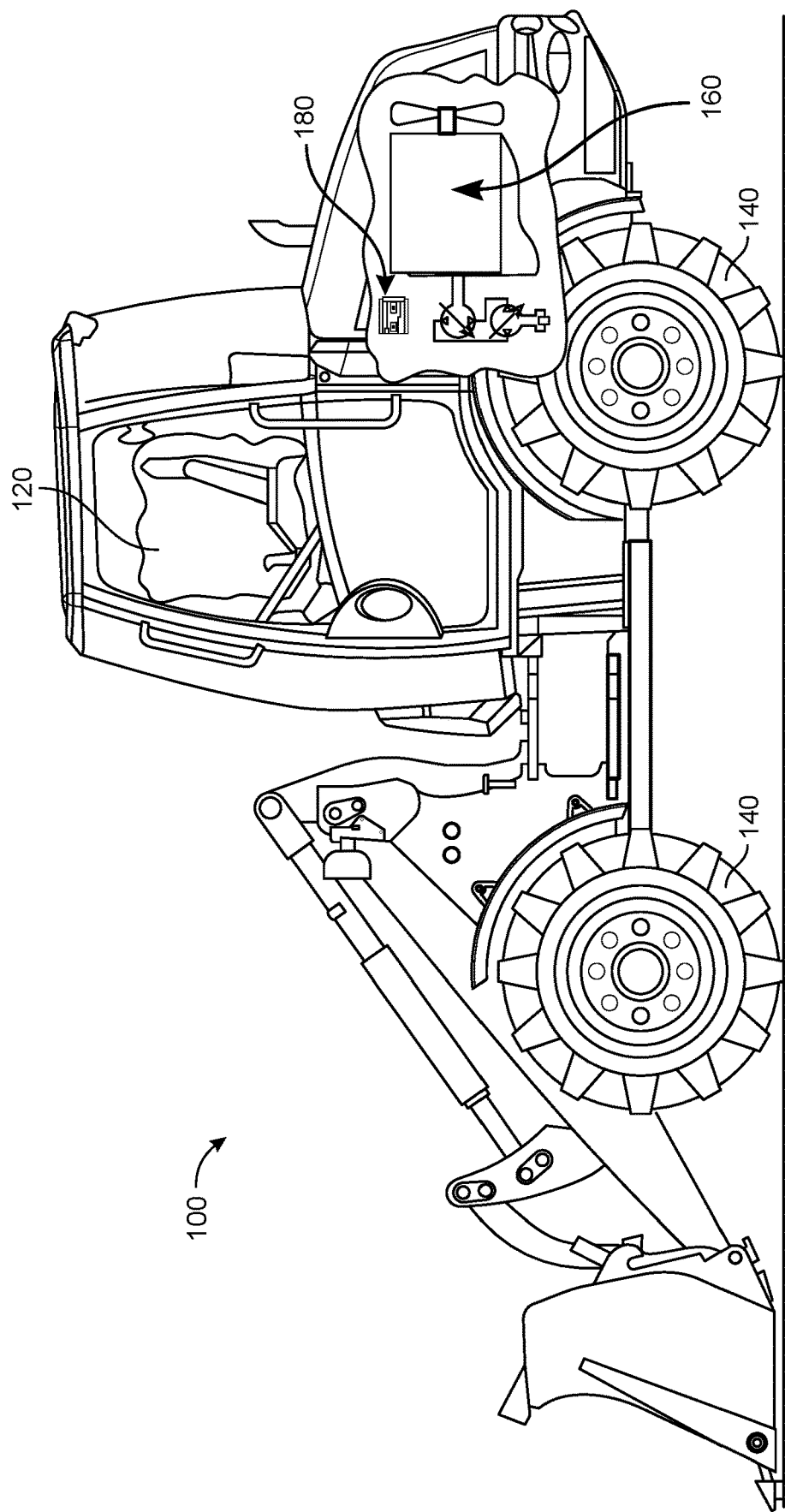
FIG. 1 is a diagram of an example machine described herein.

FIG. 1 is a diagram of an example machine 100 described herein. For example, machine 100 may include a mobile machine, such as the wheel loader shown in FIG. 1, or any other type of mobile machine. Machine 100 may include an operator station 120, one or more traction devices 140 (sometimes referred to as ground engagements), a power source 160 operatively connected to provide power to drive at least one of traction devices 140, and a controller 180 (e.g., an ECM) connected to one or more components of machine 100. The controller 180 may perform operations related to controlling a VGT of the power source 160, as described in more detail elsewhere herein.

As indicated above, FIG. 1 is provided as an example. Other examples may differ from what is described in connection with FIG. 1.

Figure 2:
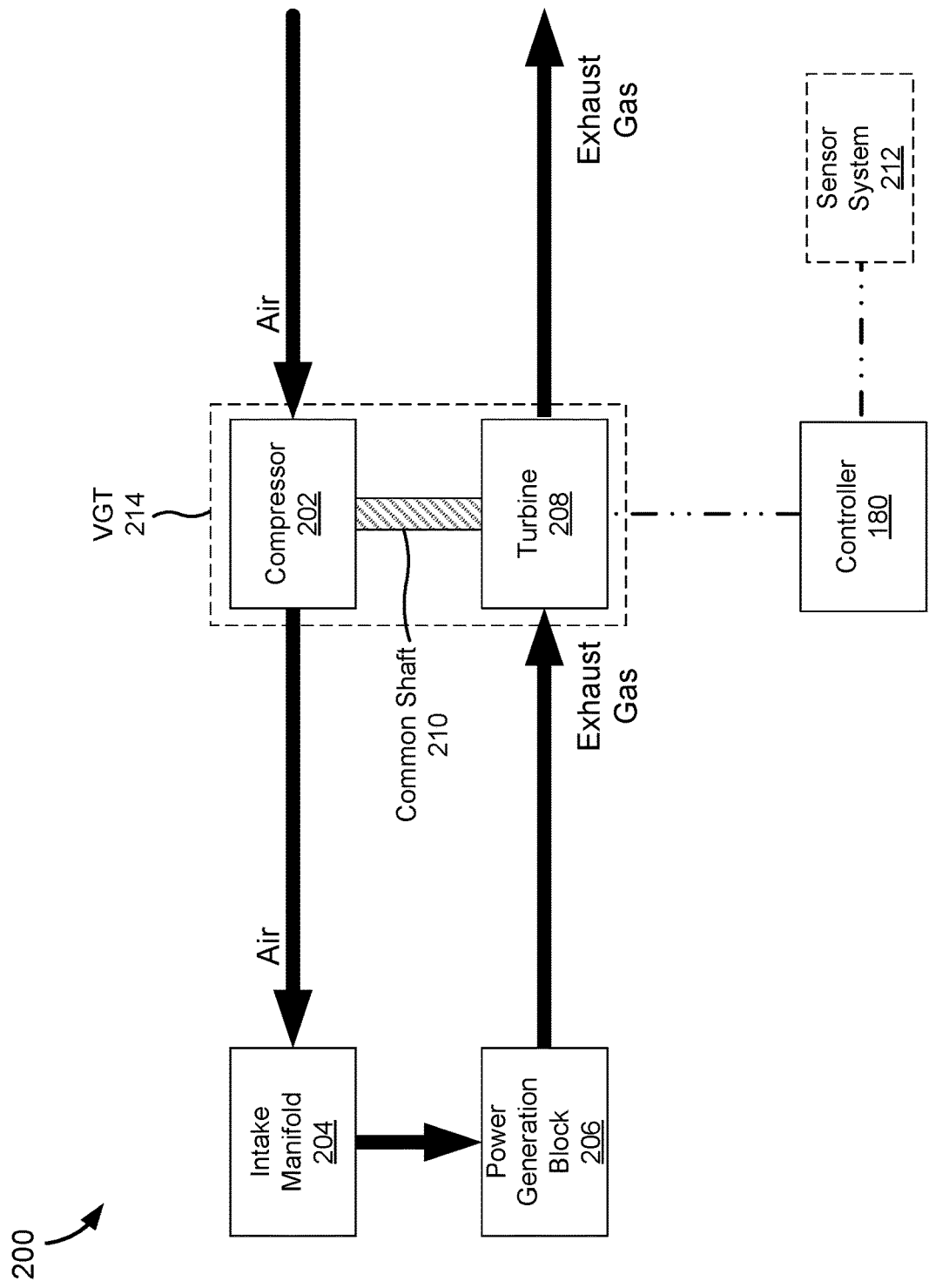
FIG. 2 is a diagram of an example engine described herein.

FIG. 2 is a diagram of an example power system 200 described herein, which may be included in the power source 160. The power system 200 may include a compression ignition, internal combustion engine, or may include any other type of internal combustion engine. Additionally, or alternatively, the power system 200 may include a fuel cell, another type of combustion engine, and/or another type of energy conversion device. The power system 200 may be fueled by such fuels as gasoline, distillate diesel fuel, biodiesel, dimethyl ether, gaseous fuels, such as hydrogen, natural gas, and propane, alcohol, ethanol, and/or any combination thereof. As shown in FIG. 2, the power system 200 may include a compressor 202, an intake manifold 204, a power generation block 206, a turbine 208, a common shaft 210, a sensor system 212, the controller 180, and/or one or more other components (not shown). Together, the compressor 202, the turbine 208, and the common shaft 210 form a VGT 214, as further described herein.

As further shown in FIG. 2, air (e.g., ambient air from an environment external to the power system 200) may be introduced into the power system 200, such as via the compressor 202. In some implementations, an exhaust gas (e.g., produced by the power generation block 206 of the power system 200) may be provided to the compressor 202 (e.g., via an exhaust gas recirculation (EGR) system, not shown), and therefore the compressor 202 may introduce air and the exhaust gas into the power system 200. The compressor 202 may pressurize and provide the air (or the air and the exhaust gas) to the intake manifold 204. The intake manifold 204 may mix and distribute the air (or the air and the exhaust gas) to the power generation block 206 for use in a subsequent power production process (e.g., to generate and provide power to drive at least one of traction devices 140 of the machine 100).

As part of the power production process, the power generation block 206 produces an exhaust gas that flows from the power generation block 206. For example, when the power generation block 206 includes a plurality of cylinders (e.g., six or more cylinders), the plurality of cylinders may produce an exhaust gas as a result of a combustion process. The exhaust gas may flow to the turbine 208. A portion of the exhaust gas may be provided to the compressor 202 (e.g., via the EGR system).

The turbine 208 may be located to receive the exhaust gas from the power generation block 206 and may be connected to the compressor 202 via the common shaft 210. As the exhaust gas flows through the turbine 208 and expands against vanes (and/or other components) thereof, the turbine 208 may rotate and drive the compressor 202 to pressurize air (or air and exhaust gas).

The turbine 208, the compressor 202, and the common shaft 210 may form the VGT 214. That is, the VGT 214 may include an assembly that comprises the turbine 208, the compressor 202, and the common shaft 210 (e.g., where the turbine 208 and the compressor 202 are connected to the common shaft 210 via respective wheels), which is sometime referred to as a "shaft and wheel" assembly. The turbine 208 may be a variable geometry turbine that includes one or more adjustable components, such as one or more adjustable vanes, an adjustable intake, an adjustable outtake, and/or an adjustable flow area control element, each of which may be adjusted to alter a performance of the VGT 214. For example, the one or more adjustable vanes may be extended to a "closed" position or may be retracted to an "open" position or a "partially open" position, which may control how much the common shaft 210 rotates and may therefore cause more or less of the energy from the flow of the exhaust gas to be transferred to the compressor 202 (e.g., via the common shaft 210). This may cause the compressor 202 to modify (e.g., increase or decrease) a flow of air (and/or a flow of air and exhaust gas) to the intake manifold 204. This, in turn, modifies (e.g., increases or decreases) a flow of exhaust gas through the VGT 214, which modifies (e.g., increases or decreases) a speed of the VGT 214 (e.g., a speed of the shaft and wheel assembly of the VGT 214, a speed at which the turbine 208 rotates on the common shaft 210, and/or another speed associated with the VGT 214).

Over an operable life of the VGT 214, the one or more adjustable components of the VGT 214 are subject to wear, such as due to movement of the one or more adjustable components. For example, the one or more adjustable vanes are subject to wear due to moving between closed, open, and partially open positions. This affects a durability of the one or more adjustable components, which decreases a performance of the VGT 214, and ultimately leads to failure of the one or more adjustable components and therefore failure of the VGT 214. Accordingly, it is important to control the VGT 214 (e.g., control movement, or adjustment, of the one or more adjustable components) to reduce an amount of excessive movements of the one or more adjustable components and to thereby improve the durability of the one or more adjustable components, which reduces a likelihood of impaired performance of the power system 200 and/or components of the power system 200 that would be affected by a failure of the VGT 214.

The controller 180, as described further herein, may provide control of the power system 200 and/or components of the power system 200, such as the VGT 214. The controller 180 may be implemented as a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor may be implemented in hardware, firmware, and/or a combination of hardware and software. The controller 180 may include one or more processors capable of being programmed to perform a function. One or more memories, including a random-access memory (RAM), a read only memory (ROM), and/or another type of dynamic or static storage device (e.g., a flash memory, a magnetic memory, and/or an optical memory) may store information and/or instructions for use by the controller 180. The controller 180 may include a memory (e.g., a non-transitory computer-readable medium) capable of storing instructions, that when executed, cause the processor to perform one or more processes and/or methods described herein.

The sensor system 212 may provide measurements associated with various parameters used by the controller 180 to enable control of the power system 200 and/or components of the power system 200. The sensor system 212 may include physical sensors and/or any appropriate type of control system that generates values of sensing parameters based on a computational model and/or one or more measured parameters. As used herein, "sensing parameters" may refer to those measurement parameters that are directly measured and/or estimated by one or more sensors (e.g., physical sensors, virtual sensors, and/or other sensors). Example sensors may include temperature sensors (e.g., to measure a temperature of an oil of the engine of the power system 200), speed sensors (e.g., to measure a speed of the engine of power system 200 and/or a speed of the VGT 214, such as in terms of revolutions per minute (RPM)), position sensors (e.g., to measure respective positions of one or more components, such as one or more vanes of the turbine 208, of the VGT 214), pressure sensors (e.g., to measure a pressure, such as an intake manifold absolute pressure (IMAP) associated with the intake manifold 204 and/or backpressure on the VGT 214 caused by an exhaust gas treatment system of the power system 200, such as in terms of kilopascals (kPa)), engine airflow sensors (e.g., to measure an engine airflow rate, such as in terms of cubic meters per minute, cubic feet per minute, and/or the like), and/or other sensors. Sensing parameters may also include any output parameters that may be measured indirectly by physical sensors and/or calculated based on readings of physical sensors.

As indicated above, FIG. 2 is provided as an example. Other examples may differ from what is described in connection with FIG. 2.

Figure 3:
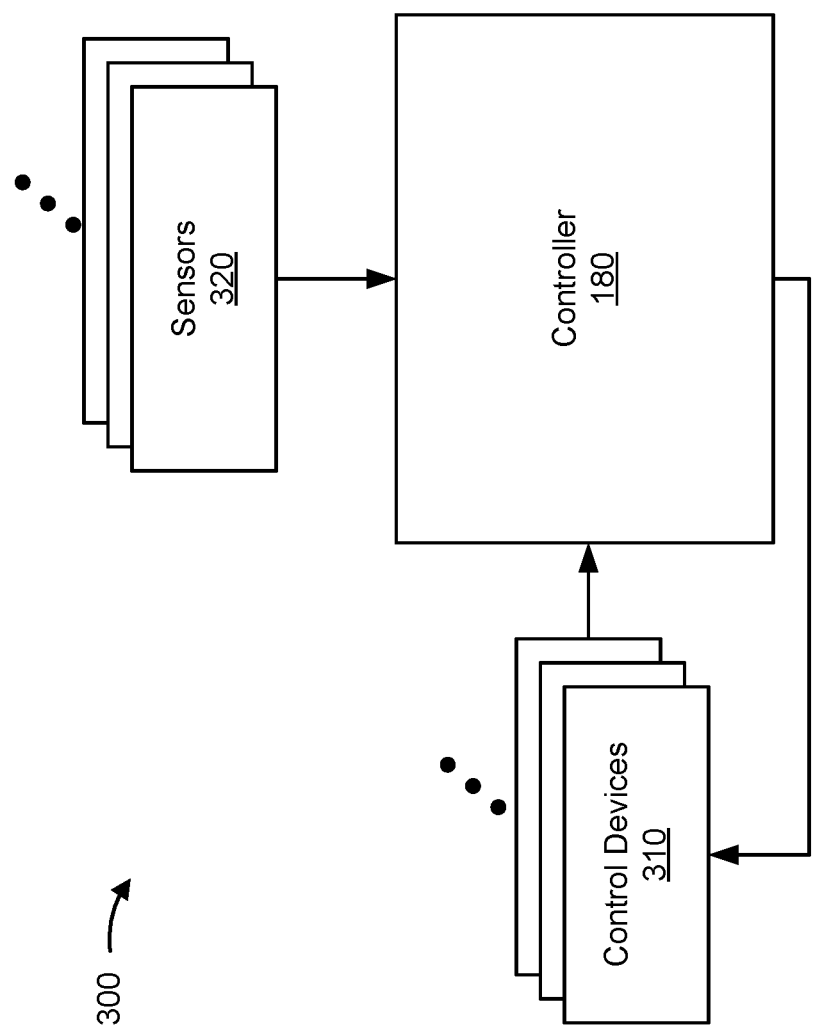
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include one or more control devices 310 (referred to individually as "control device 310" and collectively as "control devices 310"), one or more sensors 320 (referred to individually as "sensor 320" and collectively as "sensors 320"), and the controller 180. Devices and/or components of environment 300 may interconnect via wired connections, wireless connections, or a combination of wired and wireless connections.

A control device 310 may be any type of device that may be used by the controller 180 to control a performance feature of the power system 200. For example, the control device 310 may include one or more actuators, switches, and/or the like that are capable of controlling a component of the power system 200. The control device 310 may be capable of causing adjustment of one or more adjustable components of the VGT 214, such as one or more adjustable vanes of the turbine 208 of the VGT 214 (e.g., from a first vane position to a second vane position). The sensors 320 may include any type of sensor configured to measure operating conditions of the power system 200. The sensors 320 may be sensors of the sensor system 212, as described herein.

The controller 180 may include one or more devices configured to control one or more components of the power system 200. For example, the controller 180 may be configured to control the VGT 214, such as to change (e.g., to control) a flow of exhaust gas through the VGT 214 and/or a speed of the VGT 214, among other examples. The controller 180 may control the one or more components of the power system 200 by sending one or more commands to the one or more control devices 310.

The controller 180 may obtain information concerning the power system 200 from the sensors 320 (e.g., directly from the sensors 320 or via one or more other components or devices of the power system 200, such as a different controller). For example, the controller 180 may obtain information concerning a speed of an engine of the power system 200, information concerning an oil temperature of the engine of the power system 200, information concerning a setting of the VGT 214 (e.g., an "open" setting, a "closed" setting, or a "partially open" setting, that indicates a position of at least one component, such as at least one adjustable vane, of the turbine 208 of the VGT 214), and/or information concerning a speed of the VGT 214 (e.g., a speed of the turbine 208 of the VGT 214), among other examples. The controller 180 may obtain the information concerning the power system 200 based on operation of the machine 100. That is, the controller 180 may obtain the information when the machine is operating (e.g., the machine is powered on and operational).

In some implementations, the controller 180 may cause the VGT 214 to operate according to a control scheme, such as a non-dynamic control scheme or a dynamic control scheme.

For example, the controller 180 may cause the VGT 214 to operate according to a non-dynamic control scheme. To cause the VGT 214 to operate according to the non-dynamic control scheme, the controller 180 may identify a non-dynamic control map, which may be a preconfigured map that indicates suggested geometry configurations of the VGT 214 (e.g., suggested positions for the one or more adjustable components of the VGT 214) and predicted IMAPs associated with the suggested geometry configurations (e.g., for different engine operation parameters). The controller 180 may determine, based on the non-dynamic control map and one or more engine operation parameters that are associated with operation of an engine of the power system 200 (e.g., a speed of the engine of the power system 200 and/or a brake torque of the engine, among other examples, that are obtained from the sensors 320), a suggested geometry configuration of the VGT 214 and a predicted IMAP of the engine that is associated with the suggested geometry configuration. The controller 180 (e.g., by communicating with the sensor 320) then may identify a current IMAP of the engine and a current geometry configuration of the VGT 214. Accordingly, the controller 180 may cause, or prevent, adjustment of the VGT 214 based on the predicted IMAP, the present IMAP, the suggested geometry configuration of the VGT 214, and the current geometry configuration of the VGT 214. For example, the controller 180 may cause adjustment of the VGT 214 (e.g., cause the one or more adjustable components of the VGT 214 to be moved to the positions indicated by the suggested geometry configuration) when a difference between the predicted IMAP and the present IMAP satisfies (e.g., is greater than or equal to) an IMAP difference threshold (e.g., that is equal to a percentage of the predicted IMAP, such as 5%, 10%, 25, 50%, or 75%, among other examples). As another example, the controller 180 may prevent adjustment of the VGT 214 (e.g., prevent movement of the one or more adjustable components of the VGT 214 away from the positions indicated by the current geometry configuration) when a difference between the predicted IMAP and the present IMAP does not satisfy (e.g., is less than) the IMAP difference threshold.

As another example, the controller 180 may cause the VGT 214 to operate according to a dynamic control scheme. To cause the VGT 214 to operate according to the dynamic control scheme, the controller 180 may determine a suggested geometry configuration of the VGT 214 and a predicted IMAP of the engine that is associated with the suggested geometry configuration, such as by processing (e.g., using a processing technique, instead of using a preconfigured map) the one or more engine operation parameters and at least one of a plurality of hardware limit parameters associated with the engine of the power system 200 (e.g., a peak cylinder pressure parameter, a VGT speed parameter, a compressor surge parameter, a compressor choke parameter, and/or an exhaust temperature parameter, among other examples, that are obtained from the sensors 320). The controller 180 (e.g., by communicating with the sensor 320) then may identify a current IMAP of the engine and a current geometry configuration of the VGT 214. Accordingly, the controller 180 may cause, or prevent, adjustment of the VGT 214 based on the predicted IMAP, the present IMAP, the suggested geometry configuration of the VGT 214, and the current geometry configuration of the VGT 214. For example, the controller 180 may cause adjustment of the VGT 214 (e.g., cause the one or more adjustable components of the VGT 214 to be moved to the positions indicated by the suggested geometry configuration) when a difference between the predicted IMAP and the present IMAP are different (e.g., not equal to each other) and the suggested geometry configuration and the current geometry configuration are different. Otherwise, the controller 180 may prevent adjustment of the VGT 214.

In this way, the controller 180, when causing the VGT 214 to operate according to the dynamic control scheme, may allow the VGT 214 to be actively adjusted to target a desired pressure (e.g., a target desired boost pressure) associated with the VGT 214, such as by being continually adjusted to minimize a difference between the desired pressure and a current pressure (e.g., a current boost pressure). In comparison, the controller 180, when causing the VGT 214 to operate according to the non-dynamic control scheme, may allow the VGT 214 to be passively adjusted (e.g., by using the non-dynamic control map, such as based on other parameters) to target the desired pressure associated with the VGT 214, such as by being adjusting only when a difference between the desired pressure and the current pressure becomes too large.

In some implementations, causing the VGT 214 to operate according to the dynamic control scheme may allow the VGT 214 to be adjusted (e.g., by the controller 180 and/or the one or more control devices 310) at an adjustment rate that satisfies (e.g., is greater than or equal to) a threshold adjustment rate. For example, the controller 180 may allow the VGT 214 to be adjusted (e.g., by the controller 180 and/or the one or more control devices 310) at an adjustment rate of several times per second when the threshold adjustment rate is one adjustment per second. Additionally, causing the VGT 214 to operate according to the non-dynamic control scheme may prevent the VGT from being adjusted at an adjustment rate that satisfies the threshold adjustment rate. For example, the controller 180 may prevent the VGT 214 from being adjusted more than once per second when the threshold adjustment rate is one adjustment per second. Accordingly, the VGT 214 may be allowed to be adjusted at a first maximum adjustment rate when the VGT 214 operates according to the dynamic control scheme, and may be allowed to be adjusted at a second maximum adjustment rate (e.g., that is different than the first maximum adjustment rate) when the VGT operates according to the non-dynamic control scheme. The first maximum adjustment rate may be greater than the second maximum adjustment rate.

In some implementations, the controller 180 may determine that the VGT 214 is to operate according to the non-dynamic control scheme, and may thereby cause the VGT 214 to operate according to the non-dynamic control scheme. For example, during an initial start-up of the machine 100 and/or the engine associated with the power system 200, the controller 180 may determine that the VGT 214 is to operate according to the non-dynamic control scheme. Accordingly, the controller 180 may cause (e.g., by communicating with the one or more control devices 310) the VGT 214 to operate according to the non-dynamic control scheme.

The controller 180 may determine that the VGT 214 is to operate according to the dynamic control scheme, and may thereby cause the VGT 214 to operate according to the dynamic control scheme. For example, the controller 180 may identify that the VGT 214 is operating according to the non-dynamic control scheme (e.g., after causing the VGT to operate according to the non-dynamic control scheme). Accordingly, the controller 180 may monitor (e.g., based on causing and/or identifying that the VGT is operating according to the non-dynamic control scheme), a plurality of hardware limit parameters associated with engine (e.g., during a first time period associated with operation of the VGT 214 according to the non-dynamic control scheme). The plurality of hardware limit parameters may include at least two (or at least three, four, or more) of a peak cylinder pressure parameter (e.g., that indicates a peak cylinder pressure associated with the plurality cylinders of the generation block 206); a VGT speed parameter (e.g., that indicates a speed of the shaft and wheel assembly of the VGT 214, a speed at which the turbine 208 rotates on the common shaft 210, and/or another speed associated with the VGT 214); a compressor surge parameter (e.g., that indicates a compressor surge value associated with the compressor 202 of the VGT 214); a compressor choke parameter (e.g., that indicates a compressor choke value associated with the compressor 202 of the VGT 214); or an exhaust temperature parameter (e.g., that indicates a temperature of the exhaust gas before, during, and/or after flowing through the turbine 208 of the VGT 214), among other examples.

Each hardware limit parameter may be associated with a respective dynamic threshold. When the hardware limit parameter satisfies (e.g., is greater than or equal to) the dynamic threshold associated with that hardware limit parameter, the VGT 214 should operate according to the dynamic control scheme (e.g., to prevent the hardware limit parameter from increasing to a level that has a likelihood of causing damage to the VGT 214, the power system 200, and/or the machine 100). Accordingly, the controller 180 may determine (e.g., based on monitoring the plurality hardware limit parameters during the first time period) that a hardware limit parameter, of the plurality of hardware limit parameters, satisfies a dynamic threshold for the hardware limit parameter. The controller 180 (e.g., based on determining that the hardware limit parameter satisfies the dynamic threshold) may therefore cause (e.g., by communicating with the one or more control devices 310) the VGT 214 to operate according to the dynamic control scheme.

The controller 180 (e.g., after causing the VGT 214 to operate according to the dynamic control scheme) may determine that the VGT 214 is to operate (e.g., to operate again) according to the non-dynamic control scheme, and may thereby cause the VGT 214 to operate (again) according to the non-dynamic control scheme. For example, the controller 180 may monitor (e.g., may monitor again) the plurality of hardware limit parameters (e.g., during a second time period associated with operation of the VGT 214 according to the dynamic control scheme). Each hardware limit parameter may be associated with a respective non-dynamic threshold. When each hardware limit parameter satisfies (e.g., is less than or equal to) the non-dynamic threshold associated with that hardware limit parameter, the VGT 214 should operate according to the non-dynamic control scheme (e.g., because dynamic control of the VGT 214 is not needed to prevent damage to the VGT 214, the power system 200, and/or the machine 100). Accordingly, the controller 180 may determine (e.g., based on monitoring the plurality hardware limit parameters during the second time period) that the plurality of hardware limit parameters satisfy a plurality of non-dynamic thresholds (e.g., that each hardware limit parameter, of the plurality of hardware limit parameters, satisfies a non-dynamic threshold for the hardware limit parameter). The controller 180 (e.g., based on determining that the plurality of hardware limit parameters satisfy the plurality of non-dynamic thresholds) may therefore cause (e.g., by communicating with the control devices 310) the VGT 214 to operate (again) according to the non-dynamic control scheme.

In a similar manner as that described above, the controller 180 (e.g., after causing the VGT 214 to operate again according to the non-dynamic control scheme) may determine that the VGT 214 is to operate (e.g., to operate again) according to the dynamic control scheme, and may thereby cause the VGT 214 to operate (again) according to the dynamic control scheme. For example, the controller 180 may monitor (e.g., monitor again) the plurality of hardware limit parameters, and may thereby determine, that a hardware limit parameter, of the plurality of hardware limit parameters, satisfies a dynamic threshold. The controller 180 then may cause, based on determining that the hardware limit parameter satisfies the dynamic threshold, the VGT to operate (again) according to the dynamic control scheme.

Notably, for each hardware limit parameter of the plurality of hardware limit parameters, the dynamic threshold for the hardware limit parameter and the non-dynamic threshold for the hardware limit parameter may be different. For example, the dynamic threshold may be greater than the non-dynamic threshold. This allows the controller 180 to cause the VGT 214 to operate according to the dynamic control scheme for values of a hardware limit parameter that would not otherwise be sufficient to cause the controller 180 to switch operating from the non-dynamic control scheme to the dynamic control scheme, but may prevent unnecessary switching between the control schemes. In this way, the controller 180 provides a hysteresis functionality for controlling the VGT 214.

The controller 180 may delay switching between control schemes (e.g., may delay causing the VGT 214 to operate according to the dynamic control scheme when the VGT 214 is operating according to the non-dynamic control scheme, or vice versa). This may prevent unnecessary switching between the control schemes. For example, the controller 180, to cause the VGT 214 to operate according to the dynamic control scheme (after operating according to the non-dynamic control scheme), may determine a first time at which the controller 180 determined that the hardware limit parameter satisfies the dynamic threshold (e.g., as described above), and may cause, at a second time after the first time, the VGT to operate according to the dynamic control scheme (e.g., as described above). As another example, the controller 180, to cause the VGT 214 to operate according to the non-dynamic control scheme (after operating according to the dynamic control scheme), may determine a first time at which the controller 180 determined that each hardware limit parameter satisfies the non-dynamic threshold for the hardware limit parameter (e.g., as described above), and may cause, at a second time after the first time, the VGT 214 to operate according to the non-dynamic control scheme (e.g., as described above). Notably, in each example, a difference between the first time and the second time may satisfy (e.g., may be greater than or equal to) a time difference threshold (e.g., that is 1 second, 2 seconds, 3 seconds, 5 seconds, or 10 seconds, among other examples). In this way, the controller 180 provides a debounce functionality for controlling the VGT 214.

In some implementations, the controller 180 may cause the VGT 214 to be adjusted at a higher speed when operating according to the dynamic control scheme and at a lower speed when operating according to the non-dynamic control scheme. For example, to cause the VGT 214 to operate according to the dynamic control scheme, the controller 180 may increase an adjustment speed of the VGT 214, and may thereby cause (e.g., based on increasing the adjustment speed) the VGT 214 to operate according to the dynamic control scheme. This may allow the VGT 214 to quickly provide an optimized performance while the VGT 214 operates according to the dynamic control scheme. As another example, to cause the VGT 214 to operate according to the non-dynamic control scheme, the controller 180 may decrease the adjustment speed of the VGT 214, and may thereby cause (e.g., based on decreasing the adjustment speed) the VGT 214 to operate according to the non-dynamic control scheme. This may allow the VGT 214 to reduce a stress on the one or more adjustable components of the VGT 214 (e.g., that would otherwise be caused by an increased adjustment speed), which thereby improves a durability of the one or more adjustable components of the VGT 214.

The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
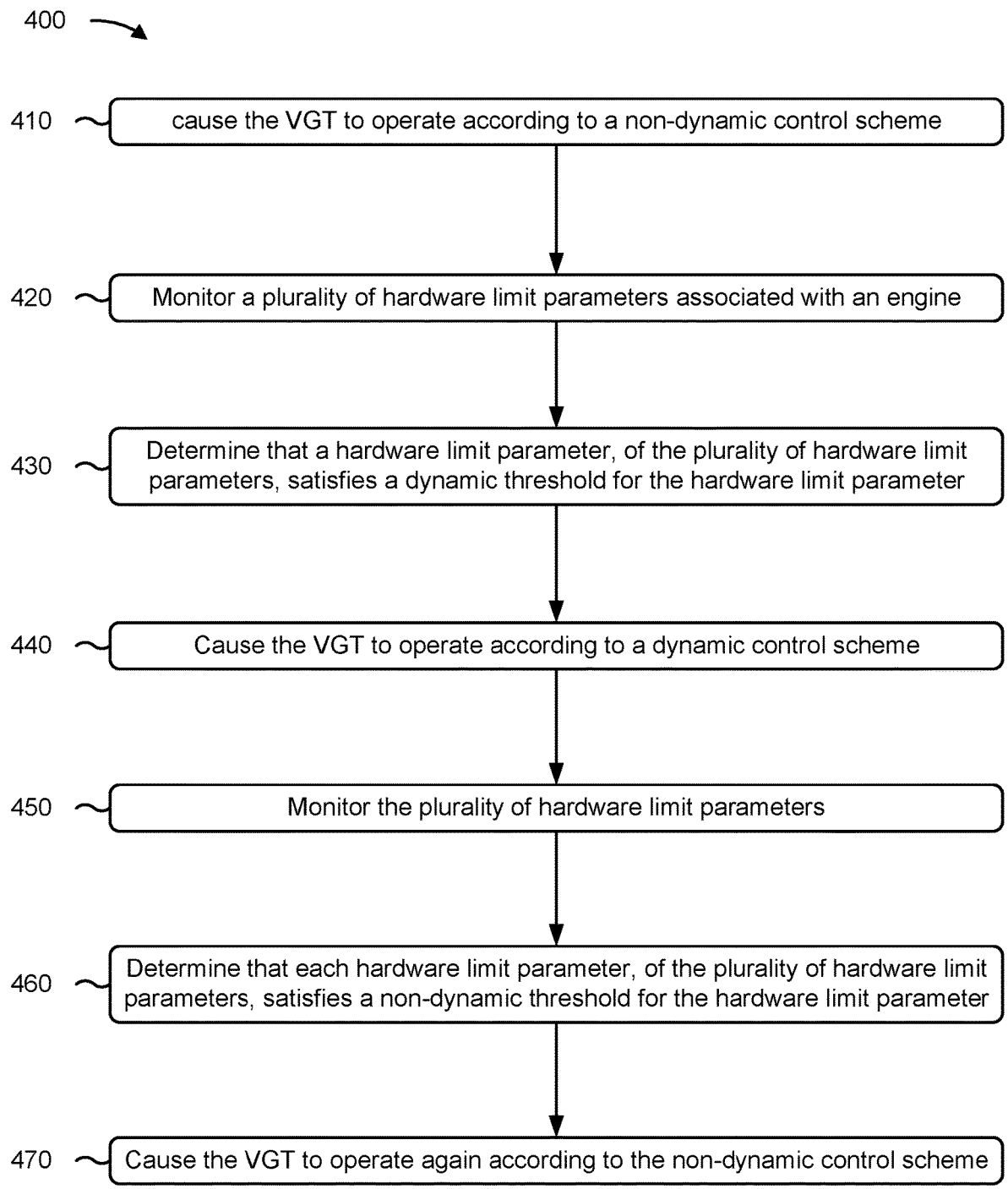
FIG. 4 is a flowchart of an example process associated with control of a variable geometry turbocharger (VGT).

FIG. 4 is a flowchart of an example process 400 associated with controlling a VGT. One or more process blocks of FIG. 4 may be performed by a controller (e.g., the controller 180). In some implementations, one or more process blocks of FIG. 4 may be performed by another device or a group of devices separate from or including the controller, such as a control device (e.g., the control device 310) and/or a sensor (e.g., the sensor 320).

As shown in FIG. 4, process 400 may include causing the VGT to operate according to a non-dynamic control scheme (block 410). For example, the controller may cause the VGT to operate according to a non-dynamic control scheme, as described above.

As further shown in FIG. 4, process 400 may include monitoring, based on causing the VGT to operate according to the non-dynamic control scheme, a plurality of hardware limit parameters associated with an engine (block 420). For example, the controller may monitor, based on causing the VGT to operate according to the non-dynamic control scheme, a plurality of hardware limit parameters associated with an engine, as described above.

As further shown in FIG. 4, process 400 may include determining that a hardware limit parameter, of the plurality of hardware limit parameters, satisfies a dynamic threshold for the hardware limit parameter (block 430). For example, the controller may determine, based on monitoring the plurality of hardware limit parameters, that a hardware limit parameter, of the plurality of hardware limit parameters, satisfies a dynamic threshold for the hardware limit parameter, as described above.

As further shown in FIG. 4, process 400 may include causing the VGT to operate according to a dynamic control scheme (block 440). For example, the controller may cause, based on determining that the hardware limit parameter satisfies the dynamic threshold, the VGT to operate according to a dynamic control scheme, as described above.

As further shown in FIG. 4, process 400 may include monitoring the plurality of hardware limit parameters (block 450). For example, the controller may monitor, based on causing the VGT to operate according to the dynamic control scheme, the plurality of hardware limit parameters, as described above.

As further shown in FIG. 4, process 400 may include determining that each hardware limit parameter, of the plurality of hardware limit parameters, satisfies a non-dynamic threshold for the hardware limit parameter (block 460). For example, the controller may determine, based on monitoring the plurality of hardware limit parameters during the second time period, that each hardware limit parameter, of the plurality of hardware limit parameters, satisfies a non-dynamic threshold for the hardware limit parameter, as described above.

As further shown in FIG. 4, process 400 may include causing the VGT to operate again according to the non-dynamic control scheme (block 470). For example, the controller may cause, based on determining that each hardware limit parameter satisfies the non-dynamic threshold for the hardware limit parameter, the VGT to operate again according to the non-dynamic control scheme, as described above.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

The above-described techniques allow a controller 180 of a machine 100 to control a VGT 214 (e.g., one or more adjustable components of the VGT 214) that is associated with a power source 160, which may include a power system 200. The controller 180 monitors a plurality of hardware limit parameters associated with an engine associated with the power source 160 and determines whether to cause the VGT 214 to operate according to a dynamic control scheme (e.g., to allow active adjustment of the VGT 214 to target a desired pressure associated with the VGT 214) or a non-dynamic control scheme (e.g., to allow passive adjustment of the VGT 214 to target the desired pressure associated with the VGT 214).

Accordingly, the controller 180 causes the VGT 214 to operate according to the dynamic control scheme when a hardware limit parameter satisfies (e.g., is greater than or equal to) a dynamic threshold, which decreases a likelihood that VGT 214 operates in a manner that causes damage to the VGT 214, the power system 200, the power source 160, and/or the machine 100. Further, when the VGT 214 operates according to the dynamic control scheme, the VGT 214 is allowed to adjust at an adjustment rate that satisfies (e.g., is greater than or equal to) a threshold adjustment rate, which enables the VGT 214 to quickly provide an optimized performance.

Further, the controller 180 causes the VGT 214 to operate according to the non-dynamic control scheme when the plurality of hardware limit parameters satisfy (e.g., are less than or equal to) a plurality of non-dynamic thresholds (e.g., when a danger of operating the VGT 214 in a manner that causes damage to the VGT 214, the power system 200, the power source 160, and/or the machine 100 is reduced). When the VGT 214 operates according to the non-dynamic control scheme, the VGT 214 is prevented from adjusting at an adjustment rate that satisfies (e.g., is greater than or equal to) the threshold adjustment rate, which reduces a number of excessive movements of one or more adjustable components of the VGT 214. This thereby improves a durability of the one or more adjustable components and reduces a likelihood of failure of the VGT 214, which reduces a likelihood of impaired performance of the power system 200, the power source 160, and/or the machine 100 due to a failure of the VGT 214.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A machine comprising:
a single variable geometry turbocharger (VGT); and
a controller configured to:
cause the VGT to operate according to a non-dynamic control scheme;
monitor, based on the causing the VGT to operate according to the non-dynamic control scheme, a plurality of hardware limit parameters associated with an engine of the machine during a first time period, the plurality of hardware limit parameters including at least two of: a peak cylinder pressure parameter; a VGT speed parameter; a compressor surge parameter; a compressor choke parameter; or an exhaust temperature parameter;
determine, based on the monitoring the plurality of hardware limit parameters during the first time period, that a hardware limit parameter, of the plurality of hardware limit parameters, satisfies a dynamic threshold for the hardware limit parameter;
cause, based on the determining that the hardware limit parameter satisfies the dynamic threshold, the VGT to operate according to a dynamic control scheme;
monitor, based on the causing the VGT to operate according to the dynamic control scheme, the plurality of hardware limit parameters during a second time period;
determine, based on the monitoring the plurality of hardware limit parameters during the second time period, that each said hardware limit parameter, of the plurality of hardware limit parameters, satisfies a non-dynamic threshold for the hardware limit parameter; and
cause, based on the determining that each hardware limit parameter satisfies the non-dynamic threshold for the hardware limit parameter, the VGT to operate again according to the non-dynamic control scheme,
wherein the controller, to cause the VGT to operate according to the dynamic control scheme, is configured to:
implement a first time difference threshold,
determine a first time at which the controller determined the hardware limit parameter satisfies the dynamic threshold for the hardware limit parameter, and
cause, at a second time after the first time, and responsive to the second time reaching or exceeding the first time difference threshold, the VGT to operate according to the dynamic control scheme.

2. The machine of claim 1, wherein the controller, to cause the VGT to operate, or to operate again, according to the non-dynamic control scheme, is configured to:
identify a non-dynamic control map;
determine, based on the non-dynamic control map and one or more engine operation parameters associated with the engine, a suggested geometry configuration of the VGT and a predicted intake manifold absolute pressure (IMAP) of the engine that is associated with the suggested geometry configuration;
identify a current IMAP of the engine and a current geometry configuration of the VGT; and
cause, or prevent, adjustment of the VGT based on the predicted IMAP, the current IMAP, the suggested geometry configuration of the VGT, and the current geometry configuration of the VGT.

3. The machine of claim 1, wherein the controller, to cause the VGT to operate according to the dynamic control scheme, is configured to:
determine, by processing at least one of the plurality of hardware limit parameters and one or more engine operation parameters associated with the engine, a suggested geometry configuration of the VGT and a predicted intake manifold absolute pressure (IMAP) of the engine that is associated with the suggested geometry configuration;
identify a current IMAP of the engine and a current geometry configuration of the VGT; and
cause, or prevent, adjustment of the VGT based on the predicted IMAP, the current IMAP, the suggested geometry configuration of the VGT and the current geometry configuration of the VGT.

4. The machine of claim 1, wherein, for each hardware limit parameter of the plurality of hardware parameters, the dynamic threshold for the hardware limit parameter and the non-dynamic threshold for the hardware limit parameter are different.

5. The machine of claim 1, wherein the controller, to cause the VGT to operate again according to the non-dynamic control scheme, is configured to:
determine a third time at which the controller determined that each hardware limit parameter satisfies the non-dynamic threshold for the hardware limit parameter; and
cause, at a fourth time after the third time, the VGT to operate again according to the non-dynamic control scheme responsive to a second difference between the third time and the fourth time satisfying a second time difference threshold.

6. The machine of claim 1, wherein the controller, to cause the VGT to operate according to the dynamic control scheme, is configured to:
increase an adjustment speed of the VGT; and cause, based on the increasing the adjustment speed of the VGT, the VGT to operate according to the dynamic control scheme.

7. The machine of claim 1, wherein the controller, to cause the VGT to operate, or to operate again according to the non-dynamic control scheme, is configured to:
decrease an adjustment speed of the VGT; and
cause, based on the decreasing the adjustment speed of the VGT, the VGT to operate according to the non-dynamic control scheme.

8. A controller of a machine, comprising:
one or more memories;
one or more processors configured to:
identify that a single variable geometry turbocharger (VGT) of the machine is operating according to a non-dynamic control scheme;
monitor, after the identifying that the VGT is operating according to the non-dynamic control scheme, a plurality of hardware limit parameters associated with an engine of the machine, the plurality of hardware limit parameters excluding including at least two of: a peak cylinder pressure parameter; a VGT speed parameter; a compressor surge parameter; a compressor choke parameter; or an exhaust temperature parameter;
determine, based on the monitoring the plurality of hardware limit parameters, that a hardware limit parameter, of the plurality of hardware limit parameters, satisfies a dynamic threshold; and
cause, based on the determining that the hardware limit parameter satisfies the dynamic threshold, the VGT to operate according to a dynamic control scheme,
wherein the one or more processors, to cause the VGT to operate according to the dynamic control scheme, is configured to:
determine a first time at which the one or more processors determined the hardware limit parameter satisfies the dynamic threshold for the hardware limit parameter, and
cause, at a second time after the first time, and responsive to the second time reaching or exceeding a first time difference threshold, the VGT to operate according to the dynamic control scheme.

9. The controller of claim 8, wherein:
causing the VGT to operate according to the dynamic control scheme allows the VGT to be adjusted at an adjustment rate that is greater than or equal to a threshold adjustment rate; and
causing the VGT to operate according to the non-dynamic control scheme prevents the VGT from being adjusted at an adjustment rate that is greater than or equal to the threshold adjustment rate.

10. The controller of claim 8, wherein the one or more processors are further configured to:
monitor again, after causing the VGT to operate according to the dynamic control scheme;
determine, based on monitoring again the plurality of hardware limit parameters, that the plurality of hardware limit parameters satisfy a plurality of non-dynamic thresholds; and
cause, based on the determining that the plurality of hardware limit parameters satisfy the plurality of non-dynamic thresholds, the VGT to operate again according to the non-dynamic control scheme.

11. The controller of claim 10,
wherein the dynamic threshold and a non-dynamic threshold, of the plurality of non-dynamic thresholds, are associated with the hardware limit parameter of the plurality of hardware limit parameters, and
wherein the dynamic threshold and the non-dynamic threshold are different.

12. The controller of claim 8, wherein the one or more processors, to cause the VGT to operate according to the dynamic control scheme, are configured to:
increase an adjustment speed of the VGT; and
cause, based on the increasing the adjustment speed of the VGT, the VGT to operate according to the dynamic control scheme.

13. A method, comprising:
determining, using a controller of a machine having a single variable geometry turbocharger (VGT), that a hardware limit parameter, of a plurality of hardware limit parameters associated with an engine of the machine, satisfies a dynamic threshold for the hardware limit parameter, the hardware limit parameter satisfying the dynamic threshold at a first time, and plurality of hardware limit parameters including at least two of: a peak cylinder pressure parameter; a VGT speed parameter; a compressor surge parameter; a compressor choke parameter; or an exhaust temperature parameter;
causing, using the controller, at a second time after the first time, and responsive to the second time reaching or exceeding a time difference threshold, the VGT to operate according to a dynamic control scheme;
identifying, using the controller of the machine, that the VGT is operating according to the dynamic control scheme;
monitoring, using the controller and after identifying that the VGT is operating according to the dynamic control scheme, the plurality of hardware limit parameters associated with the engine of the machine;
determining, using the controller and based on monitoring the plurality of hardware limit parameters, that one or more of the plurality of hardware limit parameters respectively satisfy a plurality of non-dynamic thresholds; and
causing, using the controller and based on said determining that one or more of the plurality of hardware limit parameters respectively satisfy the plurality of non-dynamic thresholds, the VGT to operate according to a non-dynamic control scheme.

14. The method of claim 13, wherein:
the VGT is allowed to be adjusted at a first maximum adjustment rate when the VGT operates according to the dynamic control scheme;
the VGT is allowed to be adjusted at a second maximum adjustment rate when the VGT operates according to the non-dynamic control scheme; and
the first maximum adjustment rate is greater than the second maximum adjustment rate.

15. The method of claim 13, further comprising:
monitoring again, after causing the VGT to operate according to the non-dynamic control scheme, the plurality of hardware limit parameters;
determining, based on monitoring again the plurality of hardware limit parameters, that a hardware limit parameter, of the plurality of hardware limit parameters, satisfies the dynamic threshold; and
causing, based on determining that the hardware limit parameter satisfies the dynamic threshold, to operate again according to the dynamic control scheme.

16. The method of claim 15,
wherein the dynamic threshold and the non-dynamic threshold, of the plurality of non-dynamic thresholds, are associated with the hardware limit parameter of the plurality of hardware limit parameters, and wherein the dynamic threshold and the non-dynamic threshold are different.

17. The method of claim 13, wherein said causing the VGT to operate according to the non-dynamic control scheme, includes:

determining a third time at which the controller determined that the plurality of hardware limit parameters respectively satisfy the plurality of non-dynamic thresholds; and causing, at a fourth time after the third time, the VGT to operate according to the non-dynamic control scheme, wherein a difference between the third time and the fourth time satisfies a second time difference threshold.

* * * * *